United States Patent
Heym et al.

(10) Patent No.: US 8,439,533 B2
(45) Date of Patent: May 14, 2013

(54) READING LAMP OR SPOTLIGHT

(75) Inventors: Detlef Heym, Achim (DE); Tilo Budinger, Hamburg (DE); Frank Gindele, Schweitenkirchen (DE)

(73) Assignee: Airbus Operations GmbH, Hamburg (DE)

( * ) Notice: Subject to any disclaimer, the term of this patent is extended or adjusted under 35 U.S.C. 154(b) by 164 days.

(21) Appl. No.: 12/971,761

(22) Filed: Dec. 17, 2010

(65) Prior Publication Data
US 2011/0164429 A1    Jul. 7, 2011

Related U.S. Application Data

(63) Continuation of application No. PCT/EP2009/057691, filed on Jun. 19, 2009.

(30) Foreign Application Priority Data

Jun. 21, 2008 (DE) .......................... 10 2008 029 511

(51) Int. Cl.
*B64D 47/02* (2006.01)
(52) U.S. Cl.
USPC ............................. 362/471; 362/237; 257/98
(58) Field of Classification Search .................. 362/471, 362/237
See application file for complete search history.

(56) References Cited

U.S. PATENT DOCUMENTS

| 7,110,183 B2 | 9/2006 | von Freyhold et al. |
| 7,150,548 B2 * | 12/2006 | Kohlmeier-Beckmann et al. ............. 362/471 |
| 2004/0213005 A1 | 10/2004 | Kohlmeier-Beckmann et al. |
| 2005/0002191 A1 | 1/2005 | Shimizu et al. |
| 2008/0080201 A1 | 4/2008 | Specht et al. |
| 2008/0310155 A1 | 12/2008 | Huang et al. |
| 2010/0033829 A1 | 2/2010 | Wippermann et al. |

FOREIGN PATENT DOCUMENTS

| DE | 103 07 147 A1 | 9/2004 |
| DE | 10 2004 004 778 A1 | 9/2005 |
| DE | 10 2005 028 671 A1 | 12/2006 |
| DE | 10 2005 061 204 A1 | 7/2007 |
| DE | 10 2006 047 941 A1 | 4/2008 |
| EP | 0905439 A2 | 3/1999 |
| EP | 1 903 274 A1 | 3/2008 |
| WO | 01 36864 A2 | 5/2001 |
| WO | 2006 105646 A1 | 10/2006 |
| WO | 2007 071397 A1 | 6/2007 |

OTHER PUBLICATIONS

International Search Report for PCT/EP2009/057691 mailed Nov. 4, 2009.
German Patent Office, German Office Action dated Jul. 13, 2012 for German Patent Application No. 10 2008 029 511.6.

* cited by examiner

*Primary Examiner* — Mary Ellen Bowman
(74) *Attorney, Agent, or Firm* — Ingrassia Fisher & Lorenz P.C.

(57) ABSTRACT

A reading device, such as a reading lamp or reading spotlight, is provided for use in a vehicle, such as a motor vehicle with immovable properties or ships. The reading device for example can be used in passenger cabins and/or cockpits of aircraft. The reading device includes, but is not limited to an LED light source with a color temperature that can be adjusted with the color "warm-white" to "cold-white", a primary optics or lens advantageously designed as a converging lens, and a secondary optics or lens to focus the light emitted by the light source onto a surface, such as a reading plane to be illuminated.

20 Claims, 2 Drawing Sheets

READING LAMP OR SPOTLIGHT

REFERENCE TO RELATED APPLICATIONS

This application is a continuation of International Application No. PCT Application PCT/EP2009/057691 filed on Jun. 19, 2009, and claims priority to German Patent Application No. 10 2008 029 511.6, filed on Jun. 21, 2008, which are both hereby incorporated in their entirety by reference.

TECHNICAL FIELD

The invention relates to a reading lamp or spotlight for use in motor vehicles, immovable properties or ships, in particular passenger cabins and/or cockpits of aircraft, with an LED light source, the color temperature of which can be set with the color "warm-white" to "cold-white", with a primary optics or lens preferably designed as a converging lens, and with a secondary optics or lens to focus the light emitted by the light source onto a surface (reading plane) to be illuminated.

BACKGROUND

One or more single light emitting diodes (LEDs) are provided as the light sources in previously known reading lamps and spotlights. These LEDs are either a monochromatic white with a fixed white color, or consist of several individual LEDs in various colors, wherein the colors of individual LEDs are mixed, in particular for generating white light. In addition, isolated use is already being made of multi-chip LEDs for RGB spotlights (red-green-blue lamps).

As evident from FIG. 1, known reading lamps and spotlights focus the light generated by a light source, e.g., an LED S, onto a surface to be illuminated, for example onto reading plane B, by means of an optical system consisting of a collective lens with focal distance f1 as the primary lens L1, an aperture G and a collective lens with a focal distance f2 as the secondary lens. The aperture G is arranged between optics (lenses) L1 and L2 in a variable distance d from the primary optics (lens) L1, wherein the distance d can correspond to the focal distance f1. The object distance between the aperture G and secondary lens L2 is marked g, while the image distance b is located between the secondary lens L2 and the surface to be illuminated/reading plane B. Since the image distance b is generally very large (to infinity) by comparison to the object distance g, the object distance g roughly corresponds to the focal distance f2 of the secondary lens L2. The LED S is arranged at the input-side focal point f1 of the primary lens L1, so that a parallel light bundle exits the primary lens L1, passes through the aperture G, and is deflected by the secondary lens L2 onto the surface to be illuminated/reading plane B, preferably bundled. A two-stage lens system is also often used for improved illumination of the aperture G, wherein the job of the first lens is mainly to collect the light from the light source, while the second lens directs this light specifically toward the aperture G. Such an optical system along with the system shown on FIG. 1 always requires at least the length of two focal distances (twofold focal distance length) in the radiating direction, specifically roughly one focal distance f1 of the primary lens L1 and one focal distance f2 of the secondary lens L2, in addition to the distance d between the primary lens L1 and aperture G. The disadvantage here is that the structural volume of the lamp, in particular the depth, must measure a specific minimum value.

DE 103 07 147 A1 describes a reading lamp for aircraft cabins that can be installed via a passenger seat in particular. A small halogen or LED lamp is preferably provided as the light source. The reading lamp is compact with a small installation volume, and makes it possible to adjust the lamp in a relatively broad range. It is a projecting reading lamp with horizontal optical axis, wherein the emitted light rays are diverted by an optical deflection means in the sitting area of the allocated passenger seat. This reading lamp also has an optical lens system, which consists of a focusing lens, an aperture and a converging lens, so that the structural volume of the lamp must here also measure a minimum value established by these components. The structural depth is decreased by shifting the optical path from the vertical to the horizontal axis.

Known from DE 10 2006 047 941 A1 is a device for homogenizing the emission of rays, in particular of light with irregular micro-lens arrays, wherein at least one lens arrangement has a plurality of lens systems arranged with parallel optical axes. The lens systems are at least partially not identical, wherein not identical means that the parameters for the array lenses, e.g., the bending radius, the free diameter, the vertex position or others, can vary form one lens to the next. However, the not identical lens system always has the same numerical aperture in a first direction parallel to the main plane of the lens system.

DE 10 2004 004 778 A1 describes a light-emitting diode lighting module with one or more light-emitting diode components and an optical device for beam shaping, which are placed downstream from the light-emitting diode component(s). The optical device has a beam-bundling optical element for each light-emitting diode component, and a beam-expanding optical element situated downstream from it as viewed from the light-emitting diode component. A light-emitting diode component that emits a red light, green light and blue light can be respectively provided, wherein the beam-expanding optical element mixes the light from the three light-emitting diode components.

Known from DE 10 2005 028 671 A1 is a method for controlling the color components of a lighting device for micro-display projection systems with several color light sources, for example LEDs or OLEDs. The light sources are controlled independently of each other. Provided to generate the color image are time windows, in which color sequential partial color images are generated, for example, for red, green or blue. The initial values for the target window components of the color light sources are empirically determined to ascertain a white point in the CIE color triangle lying in proximity to the target white light point. A combination of sequentially additive color mixing and color mixing according to the superposition principle is performed, resulting in a relative adjustment of the lighting device to the system-dependent color area or spectral transmission properties of the projection system. To control the color components, FIG. 1 of this publication depicts a CIE color triangle with a representation of the light source color locations and target color locations. The CIE color triangle integrates a color triangle comprised of the light source color locations for the primary colors green, red and blue, which also incorporates another penciled-in color triangle formed by the target color locations of the primary colors. After determining the position (coordinates) of the light source color locations and the power ratios of the color light sources in each time window, the light source color locations are transformed into the desired target color locations, wherein another white point lying in proximity to the target white point is formed. The disadvantage to this projection arrangement is that only enables the achievement of a relatively small CRI color rendering index, wherein the colors are mixed by chronologically actuating the individual primary colors green, red and blue.

Evident from DE 10 2005 061 204 A1 is a lighting device that encompasses at least one LED of a first color, preferably blue, at least one LED with a second color, preferably red, and preferably an LED of a third color, preferably green, as well as at least one white LED, all arranged on a shared substrate. A lighting controller for the lighting device encompasses among other things various controllable power sources for LEDs of different color for generating independently controlled operating signals for the LEDs of different color. The white LED can consist of a blue or UV-LED and a light converter allocated thereto. The lighting device can also encompass two or more LEDs of the same color, including white. The LEDs can be selected based on factors like wavelength and intensity, wherein such a device can cover more than 85% of the visible color space when using this distribution along with two green LEDs. FIG. 10 of this publication shows a graphic depiction of the color coordinates in the color space of the lighting device described above, wherein an outer elliptical shape represents all visible wavelengths, while an outer elliptical shape represents the colors that can be generated. A curved line in the middle of the triangular shape is referred to as a white line, since this line represents all combinations of the LEDs at all the different color temperatures that generate white light in a combination. A high CRI color rendering index is also not achieved in this lighting device.

SUMMARY

At least one object of the invention is to provide a reading lamp or spotlight of the kind mentioned at the outset that can be changed and adjusted in a color temperature range of 3,000 to 6,000 Kelvin, i.e., in the white colors "warm-white" to "cold-white", ensures good color recognition of various colors in the entire setting range, and has a significantly reduced length in the direction of ray emission.

One exemplary embodiment of the invention indicates a reading lamp or spotlight for use in motor vehicles, immovable properties or ships, for example for use in passenger cabins and/or cockpits of aircraft. The reading lamp or spotlight has an LED light source, the color temperature of which can be adjusted with the color "warm-white" to "cold-white"; a primary optics or lens designed as a converging lens, for example; and a secondary optics or lens to focus the light emitted by the light source onto a surface (reading plane) to be illuminated; wherein the LED light source is comprised of at least four high-power LEDs (S, S1, S2) with identical or varied color temperature(s) determining the color of the emitted light on or along the Planck curve in the CIE diagram (1), or with identical or varied wavelengths to achieve a high color rendering with a CRI color rendering index of between 80 and 100; wherein the light source color locations of the used high-power LED form the corner points (E1 to E4) of a color quadrangle (3) or color polygon that includes the Planck curve (2) within the CIE diagram (1), and wherein the primary optics or lens (L1, L11) has arranged downstream from it at a predetermined distance (d1, d2) as the optics or secondary lens at least one micro-optics or lens (M) to mix the light spectra emitted from the high-power LEDs (S, S1, S2), generate white light that approximates thermal radiators, and deflect the mixed light onto the surface (reading plane B) to be illuminated.

As a consequence, the light source in one exemplary embodiment of the invention consists of at least four high-power LEDs with identical or varied color temperature(s) determining the color of the emitted light on or along the Planck curve in the CIE triangle, or with identical or varied wavelengths to achieve a high color rendering with a CRI color rendering index of between 80 and 100, wherein the light source color locations of the used high-power LEDs within the CIE diagram form the corner points of a color quadrangle or polygon, which include the Planck curve, and wherein the primary optics or lens has arranged downstream from it as the secondary optics or lens at least one micro-optics or lens to mix the light spectra emitted by the high-power LEDs, generate white light that approximates thermal radiators, and deflect the mixed light onto the surface (reading plane) to be illuminated.

In order to create a reading lamp or spotlight that can be changed and adjusted in a color temperature range of 3,000 to 6,000 Kelvin, that ensures good color recognition of various colors in the entire adjustment range, and that has a significantly reduced length in the direction of ray emission, the LED light source consists of at least four high-power LEDs with identical or varied color temperature(s) determining the color of the emitted light on or along the Planck curve in the CIE diagram, or with identical or varied wavelengths to achieve a high color rendering with a CRI color rendering index of between 80 and 100. The light source color locations of the used high-power LEDs within the CIE diagram form the corner points of a color quadrangle or color polygon that includes the Planck curve. The primary lens has arranged downstream form it as the secondary lens at least one micro-lens to mix the light spectra emitted from the high-power LEDs, generate white light that approximates thermal radiators, and deflect the mixed light onto the surface (reading plane) to be illuminated. The micro-lens can consist of at least two individual micro-optics or lenses, wherein one of the individual micro-optics or lenses is used to mix the light spectra emitted by the high-power LEDs, and the other individual micro-optics or lens deflects the mixed light onto the surface (reading plane) to be illuminated.

In one exemplary embodiment of the invention, the micro-optics or lens consists of at least two individual micro-optics or lenses, wherein one of the individual micro-optics or lenses is used to mix the light spectra emitted by the high-power LEDs, and the other individual micro-optics or lens deflects the mixed light onto the surface (reading plane) to be illuminated. A combination of micro-optics or lenses and lenses can also be used.

In one exemplary embodiment of the invention, the micro-optics or lens (specially developed optics or lens) is specially refined to sharply delineate the backlit area, further making it possible to influence the shape of the zone to be illuminated, thereby enabling oval or rectangular zones, for example.

One significant advantage to the invention is that the homogeneity with which the color of the light is mixed on the surface/reading plane to be illuminated is improved by using micro-optics or lenses, while the efficiency, i.e., the optical output, of the reading lamp or spotlight is simultaneously increased. At the same time, the micro-optics or lens yields a homogeneous illumination, i.e., a uniform illuminance in the reading plane. Given differing emission heights, the micro-optics or lens enables a uniformly illuminated area with a nearly constant illuminance in the entire tile or in various shapes of the illuminated area. A CRI color rendering index of more than 80 is advantageously achieved for each color rendering. The short overall length of the reading lamp or spotlight is determined primarily by the focal distance of the primary optics or lens and distance between the primary optics or lens and micro-optics or lens. Another advantage according to the invention hence lies in the miniaturization of the optical system, making it possible to reduce the weight of the reading lamp or spotlight, and opening up new installation sites for the reading lamp or spotlight, for example in the roof liner of an aircraft with limited installation depth.

BRIEF DESCRIPTION OF THE DRAWINGS

The present invention will hereinafter be described in conjunction with the following drawing figures, wherein like numerals denote like elements, and.

The representations in the figures are diagrammatic, and not to scale.

DETAILED DESCRIPTION

Figure 1:
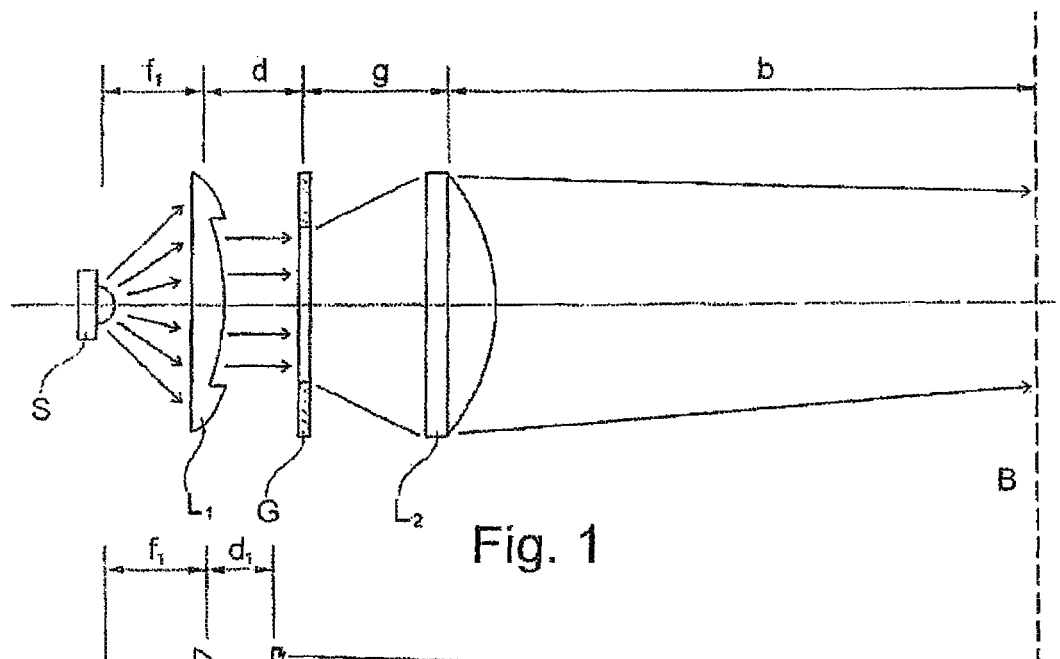
FIG. 1 shows an optical system for a reading lamp or spotlight according to prior art.
Figure 2:
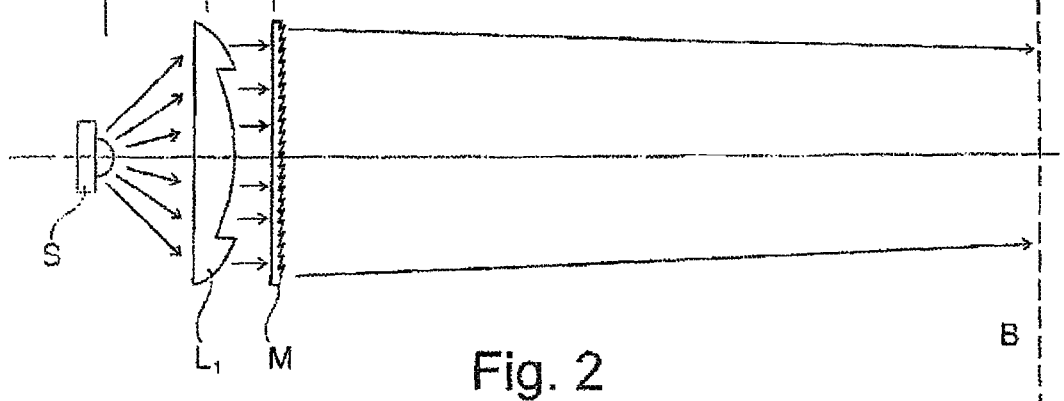
FIG. 2 shows a reading lamp or spotlight with an LED as the light source and a micro-optics or lens as the secondary optics or lens.

The reading lamp or spotlight not labeled in any greater detail on FIG. 2 has a high-power LED S, which is arranged in the input-side focal point of a primary optics or lens L1 having focal distance f1. Two or more high-power LEDs can be provide in place of an LED S, in particular four high-power LEDs, which have identical or varied color temperatures determining the color of the emitted light or wavelengths. The individual colors emitted by the high-power LEDs are superposed to generate white light or light that closely approximates white light. The color temperature is here a gauge for the color impression of a light source; it is defined as the temperature to which a black body (Plank radiator/thermal radiator) would have to be heated to emit a light having a color (given the same brightness and fixed observation conditions) most closely resembling the described color. The parallel light bundle generated by the LED and primary lens L1 strikes a micro-lens M, which is understood as a miniaturized lens or lens array, and situated downstream from the primary lens L1 at a predetermined distance d1. The distance d1 can be very small or equal to zero. The micro-lens M deflects the light bundle toward a surface to be illuminated/reading pane B. The light emitted by these LEDs can also be mixed by means of the micro-lens M when using several LEDs. Using various micro-lenses M makes it possible to advantageously achieve different emission angles of the mixed light exiting the micro-lens M, thereby enabling varied mounting heights.

Figure 3:
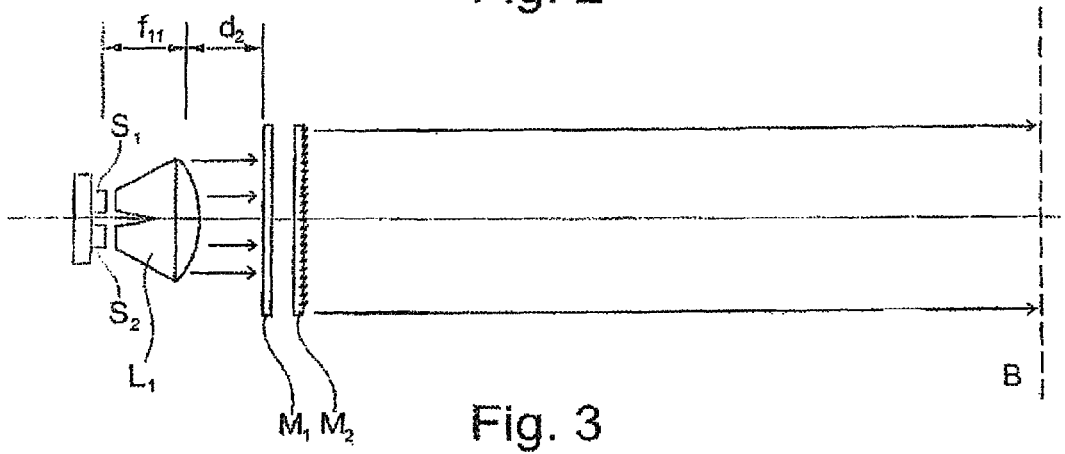
FIG. 3 shows a reading lamp or spotlight with a light source consisting of two LEDs and a micro-optics or lens consisting of two parallel arranged individual micro-optics or lenses.

The reading lamp or spotlight shown on FIG. 3 differs from the one from FIG. 2 by the use of two high-power LEDs S1 and S2, which each can also consist of four individual LEDs with identical or varied color temperatures or wavelengths, as well as of a micro-lens having two individual micro-lenses M1 and M2. The high-power LEDs S1 and S2 have identical or varied color temperatures determining the hue of the emitted light or wavelengths, and are arranged in the input-side focal point of a primary lens L11, which has situated downstream from it at a predetermined distance d2 the individual micro-lenses M1 and M2. In this reading lamp or spotlight as well, the distance d2 is determined by the quality of the parallel light bundle exiting the primary lens L11. One of the individual micro-lenses, for example lens M1, is used for mixing the light spectra emitted by the high-power LEDs S1 and S2, while the other individual micro-lens, for example lens M2, deflects the mixed light onto the surface (reading plane) to be illuminated B.

Figure 4:
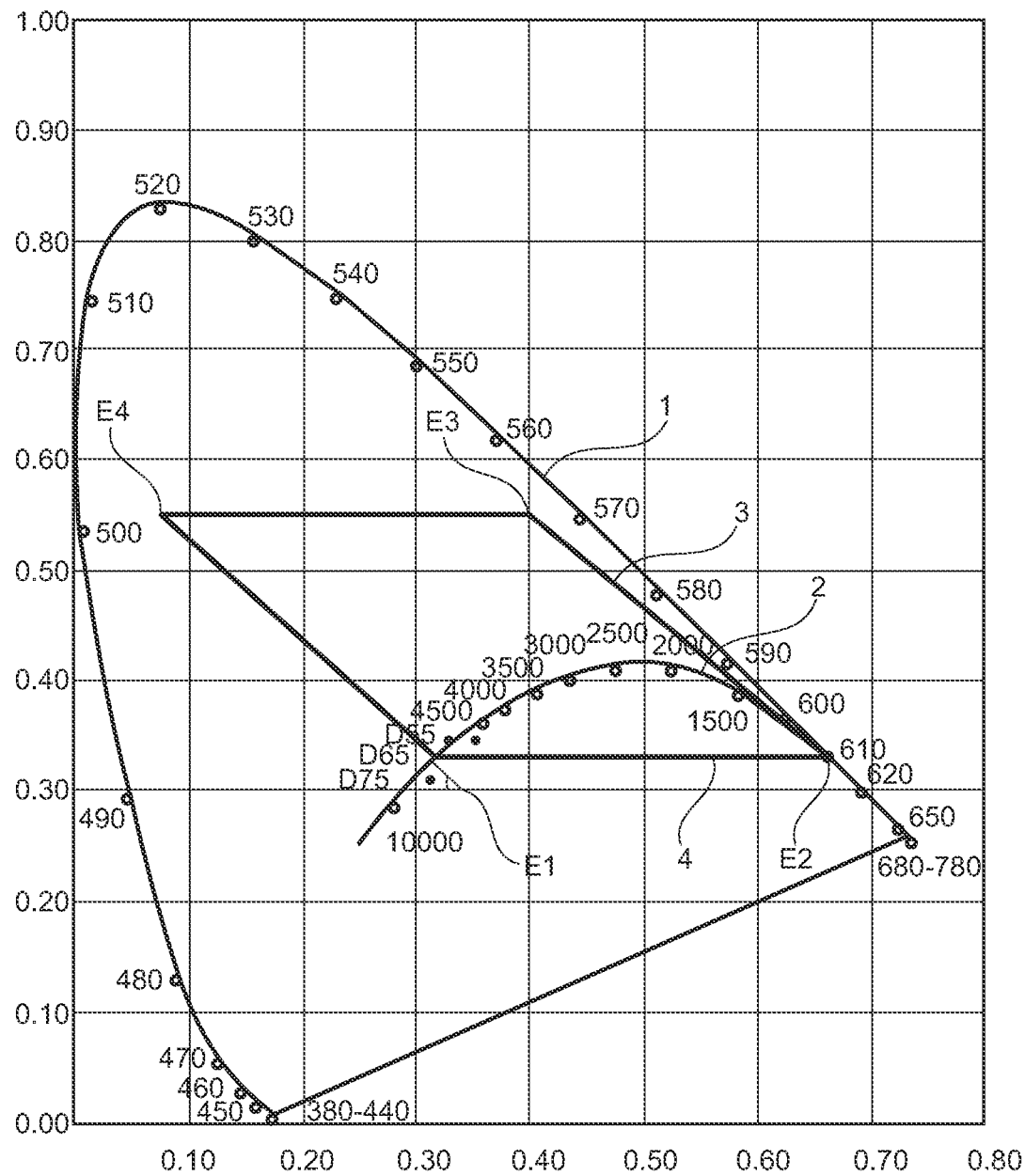
FIG. 4 shows a graphic representation of the CIE standard color chart with penciled-in the Planck curve progression and color quadrangle, having end points determined by the light source color locations of the used LEDs.

The two-dimensional diagram 1 visible on FIG. 4 shows the standard color chart developed by the Commission Internationale de l'Eclaire (CIE) in 1931, which records percentages of standard color values on the x or y axis, wherein one color location, and hence one specific color type, corresponds to each x/y pair. This standard color chart is structured in such a way that each point on the diagram represents a color, all colors on the gap between two color points can be created by mixing the colors of the end points, and that all points within a triangle can be achieved by mixing the colors of the end points.

The colors of monochromatic light lie along the tongue-shaped edge, and the non-monochromatically representable purple colors lie in its lower range, near the x axis. Located in the middle is a region in which the colors appear white to the human eye. Only the x/y values are specified on the CIE diagram 1; z-values are not included, since they can be easily calculated based on the correlation $z=1-x-y$, so that a two-dimensional diagram is sufficient.

If three points are set as colors in a triangle in the CIE diagram 1, all colors within this triangle can be obtained by mixing the corner colors; the three corner points define a color scale. All colors within this color triangle can be generated by varying the brightness of the individual colors, wherein the Commission Internationale de l'Eclaire (CIE) has introduced a standard for the colors red, green and blue. When using three LEDs, the deployed color triangle also makes it possible to generate variable white hues on or along the Planck curve. However, the disadvantage is that the CRI color rendering index is rather low for this option.

In the standard color chart on FIG. 4, the Planck curve 2 is penciled in the CIE diagram 1, wherein the curve designated as such in the standard color chart is the one that interconnects the color hues of thermal radiators of varied color temperatures. One feature of the embodiments of the present invention lies in the knowledge that mixing the individual colors emitted by the high-power LEDs makes it possible to generate light colors lying on or along the Planck curve 2, and hence are very similar in terms of their light color to the thermal radiators, where a high color rendering with a CRI color rendering index of between 80 and 100 is retained. The CRI color rendering index (CRI stands for color rendering index) is understood as a photometric variable that can be used to describe the quality of color rendering of light sources having the identical correlated color temperature. The color rendering index highlights the extent to which the color of an object changes when illuminated by two different light sources, where a maximum value of 100 can be reached, and where various test colors with a specific remission are standardized for purposes of its computation.

FIG. 4 further depicts a penciled-in color quadrangle 3 within the CIE diagram 1, which includes the Planck curve 2. The corner points E1 to E4 of the color quadrangle 3 lie within the CIE diagram 1, and are formed by the light source color locations of four used high-power LEDs. Two of these corner points E1 and E2 lying under the Planck curve 2 are determined by the light source color locations "cold-white" and "red", and interconnected by a line 4. In this arrangement having two high-power LEDs, the colors on the line 4 can be adjusted, variable "most similar" color temperatures are present, and a high CRI color rendering index is achieved. However, this arrangement does not yield an LED light source with a color temperature than can be adjusted with the color hue "warm-white" to "cold-white". In order to achieve this, another feature of the embodiments of the invention provide that at least two additional high-power LEDs with light source color locations lying above the Planck curve 2 are added to the two above high-power LEDs forming the corner points E1 and E2, thereby enabling the color quadrangle 3 visible from FIG. 4 as corner points E3 and E4. The accompanying corner points E3 and E5 of the added high-power LEDs can here be determined by the light source color locations "green or cyan" and "warm-white or yellow", for example. Combining the four colors warm-white, cold-white, red and cyan makes it possible to achieve CRI color rendering indices in excess of 90 in the entire 3,000 to 6,000 Kelvin color temperature range. The embodiments of the invention are not limited to using four high-power LEDs. Using five, six or more high-power LEDs yields a color pentagon, color hexagon or other color polygon in place of the color quadrangle depicted on FIG. 4.

When using four high-power LEDs, for example, two high-power LEDs can emit white light with an identical or varied color temperature, while a third high-power LED emits red light, and the fourth high-power LED emits green light of predetermined wavelengths. For example, this ensures that white light of varying color temperatures can be achieved along the Planck curve in the CIE diagram 1. A "warmer" color hue of the usually quite "cold" LED light is also possible, for example, by using several high-power LEDs (S1, S2) that emit white light with identical or varied color temperature, and by adding a red high-power LED with a predetermined wavelength.

A reading lamp is hereby defined as a lamp that radiates a precisely defined area in the light color white (reading plane), where the illuminance within this area is to be as homogenous as possible. A spotlight, which is also called spot lamp, refers to a lamp that tightly bundles the light emitted by a light source, and generally illuminates the area rather irregularly, where the light color can also be colored While at least one exemplary embodiment has been presented in the foregoing summary and detailed description, it should be appreciated that a vast number of variations exist. It should also be appreciated that the exemplary embodiment or exemplary embodiments are only examples, and are not intended to limit the scope, applicability, or configuration in any way. Rather, the foregoing summary and detailed description will provide those skilled in the art with a convenient road map for implementing an exemplary embodiment, it being understood that various changes may be made in the function and arrangement of elements described in an exemplary embodiment without departing from the scope as set forth in the appended claims and their legal equivalents.

What is claimed is:

1. A reading device for use in a vehicle, comprising:
    an LED light source comprising a color temperature adjustable between a warm-white color to and a cold-white color and adapted to emit a light, the LED light source comprising:
        a first high-power LED that emits a warm-white light;
        a second high-power LED that emits a cold-white light;
        a third high-power LED that emits a red light; and
        a fourth high-power LED that emits a LED cyan light of a predetermined color characteristic,
        wherein color temperatures of the first high-power LED, the second high-power LED, the third high-power LED, and the fourth high-power LED are adapted to determine a color of the light,
        wherein a color location of the first high-power LED, the second high-power LED, the third high-power LED, and the fourth high-power LED, within a CIE diagram form corner points of a plane figure having at least four sides and angles that includes a Planck curve;
    a primary optics; and
    a micro-lens downstream from the primary optics at a predetermined distance adapted to focus the light onto a surface, the micro-lens further adapted to mix a light spectra emitted from the LED light source to generate a substantially white light that approximates thermal radiators and deflects the light onto the surface.

2. The reading device according to claim 1, wherein the color temperatures of the first high-power LED, the second high-power LED, the third high-power LED, and the fourth high-power LED are adapted to determine the color of the light relative to the Planck curve in a CIE diagram.

3. The reading device according to claim 1, wherein the color temperatures of the first high-power LED, the second high-power LED, the third high-power LED, and the fourth high-power LED are adapted to determine the color of the light with wavelengths to achieve a high color rendering with a CRI color rendering index of between approximately 80 and approximately 100.

4. The reading device according to claim 1, wherein the reading device is a reading lamp.

5. The reading device according to claim 1, wherein the reading device is a reading spotlight.

6. The reading device according to claim 1, wherein the vehicle is an aircraft.

7. The reading device according to claim 6, wherein the reading device is used in a passenger cabin of the aircraft.

8. The reading device according to claim 6, wherein the reading device is used in a cockpit of the aircraft.

9. The reading device according to claim 1, wherein the plane figure is a color quadrangle.

10. The reading device according to claim 1, wherein the plane figure is a color polygon.

11. The reading device according to claim 1, wherein the primary optics is a lens.

12. The reading device according to claim 11, wherein the lens is a converging lens.

13. The reading device according to claim 12, wherein the surface is a reading plane.

14. The reading device according to claim 1, wherein the color temperatures of the first high-power LED, the second high-power LED, the third high-power LED, and the fourth high-power LED are substantially identical.

15. The reading device according to claim 1, wherein the color temperatures of the first high-power LED, the second high-power LED, the third high-power LED, and the fourth high-power LED are varied.

16. The reading device according to claim 1, wherein the predetermined color characteristic is a color temperature.

17. The reading device according to claim 1, wherein the predetermined color characteristic is a color wavelength.

18. The reading device according to claim 1,
    wherein the micro-lens comprises a first individual micro-lens and a second individual micro-lens,
    wherein the first individual micro-lens is used to mix the light emitted by the LED light source, and
    wherein the second individual micro-lens is adapted to deflect the light onto the surface.

19. The reading device according to claim 1, wherein the micro-lens is adapted to influence a shape of a zone to be illuminated in order to confine an illuminated area.

20. The reading device according to claim 1, further comprising a second micro-lenses adapted to provided different emission angles of the light exiting the micro-lens.

\* \* \* \* \*